H. L. LANSING AND J. R. KOHLS.
ELECTRIC FLOWER LAMP.
APPLICATION FILED MAR. 29, 1921.
1,419,152. Patented June 13, 1922.
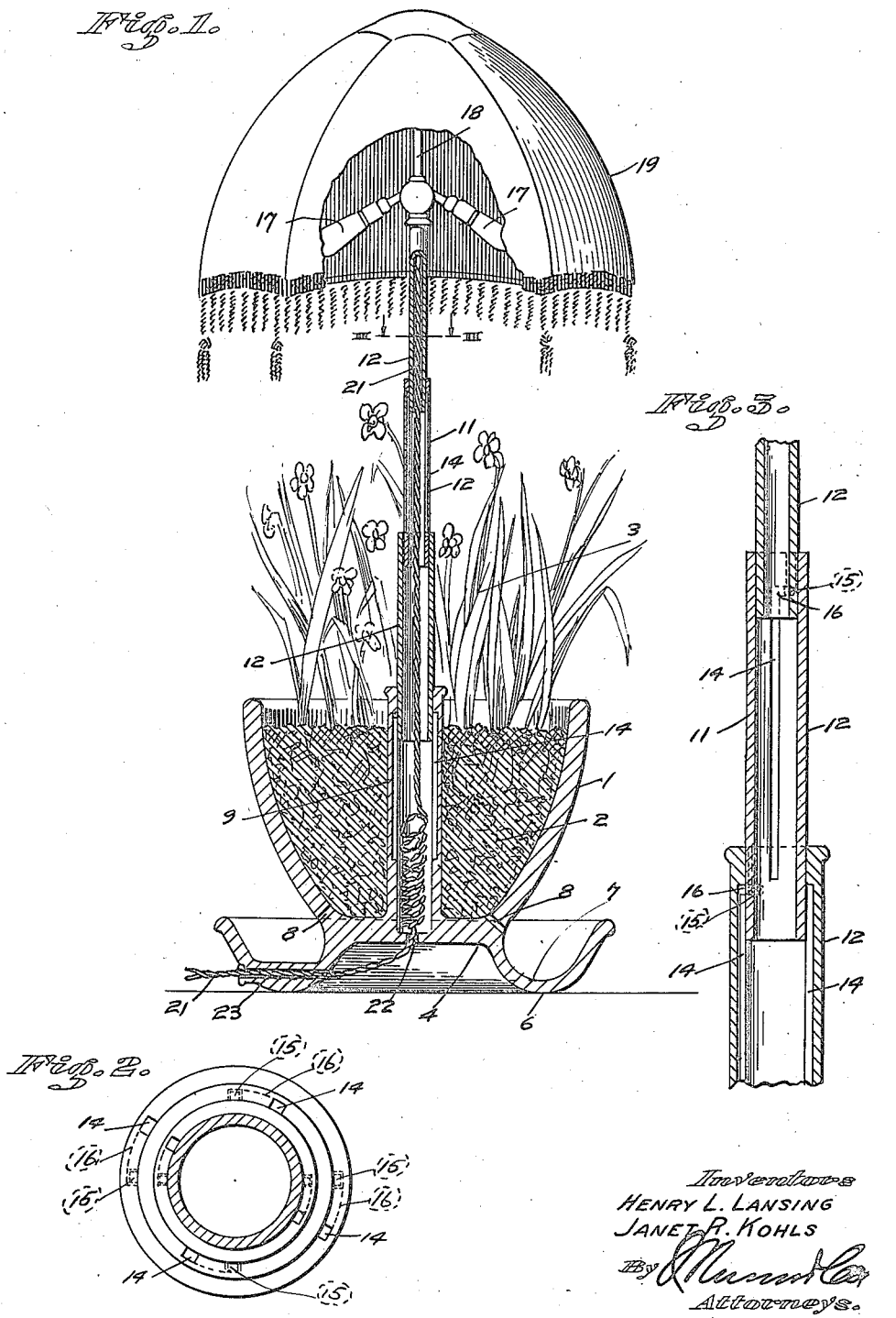

UNITED STATES PATENT OFFICE.

HENRY L. LANSING AND JANET R. KOHLS, OF SAN FRANCISCO, CALIFORNIA.

ELECTRIC FLOWER LAMP.

1,419,152.  Specification of Letters Patent.  Patented June 13, 1922.

Application filed March 29, 1921. Serial No. 456,519.

*To all whom it may concern:*

Be it known that we, HENRY L. LANSING and JANET R. KOHLS, citizens of the United States, and residents of San Francisco, county of San Francisco, and State of California, have invented a new and useful Electric Flower Lamp, of which the following is a specification.

The present invention relates to improvements in electric flower lamps and its object is to provide a combination of an electric lamp, a lamp shade and a flower pot, in which the flowers receive light and heat from the electric light, in which the distance of the lamps from the flowers can be adjusted and which will be particularly pleasing in appearance.

We attain this object by means of the device shown in the accompanying drawing, in which Figure 1 represents a side view, partly in section, of our device, Figure 2 an enlarged cross-section through the device along line 2—2 of Figure 1, and Figure 3 a sectional detail view of a telescopic support for the electric lamp.

Referring to the drawing more particularly, the flower pot (1), shaped like a bowl and filled with soil (2), has the flowers (3) growing within the same. It rises from the elevated central part (4) of a basin (6) forming an annular groove about the same into which any excessive moisture from the soil may drain through passages (8). In the center of the flower pot is provided a vertical sleeve (9), which forms an integral part of the flower pot and extends from the bottom of the same to a level somewhat above its top. This sleeve is the first link of a telescopic column (11) comprising a plurality of sections (12). Each of the latter is provided, near its bottom, with two oppositely arranged studs (15) which are adapted to slide in vertical inner grooves (14) of the next lower section. The grooves terminate at their tops in small lateral extensions (16), into which the studs may be turned and thus find a support. The top section carries the lamps (17) as shown in the drawing, and supports, on a further extension (18), the lamp shade (19), which, of course, may be of any design desired. The wires connecting the electric lamps to a source of electricity lead from the lamps through the inside of the telescopic sections, a hole (22) at the bottom of the same and a passage (23) in the bottom of the basin to the source and are adapted to coil in the lower part of the sleeve (9) when the sections are telescoped into each other.

It will thus be seen that the plants growing in the pot will receive light and heat from the lamps above the same and that by means of the telescopic sections the distance of the lamps from the flowers may be adjusted to suit the needs of the plants.

We claim:

An adjustable electric flower lamp comprising a complete plant growing unit consisting of an annular groove, a flower pot supported on the inner rim of said annular groove for receiving soil and moisture, draining passages from the flower pot into the annular groove, and adjustable means for furnishing heat and light to the growing plant in accordance with its requirements comprising a hollow column rising from within the flower pot consisting of a plurality of telescopic sections, each lower section being provided with two longitudinal, oppositely arranged grooves ending at their upper ends into horizontal side passages and each upper section having at its lower end two oppositely arranged studs adapted to engage the grooves and to be anchored in the side passages, a plurality of lamps supported on the uppermost section adapted to be connected to a source of electric power through said hollow column, and a shade supported over the lamps for reflecting the light and heat of the lamps on the flower.

HENRY L. LANSING.
JANET R. KOHLS.